United States Patent [19]

Brock

[11] Patent Number: 5,158,679

[45] Date of Patent: Oct. 27, 1992

[54] CRUDE OIL AND WATER SEPARATOR

[76] Inventor: J.R. Brock, P.O. Box 9, Bracey, Va. 23919

[21] Appl. No.: 572,123

[22] Filed: Aug. 23, 1990

[51] Int. Cl.$^5$ .............................................. C02F 1/40
[52] U.S. Cl. .................................. 210/241; 210/519; 210/523; 210/525
[58] Field of Search .............. 210/241, 242.1, 242.3, 210/519, 523, 525, 528, 923, 242.4, 924; 114/191, 270

[56] References Cited

U.S. PATENT DOCUMENTS

| | | | |
|---|---|---|---|
| 1,544,712 | 7/1925 | Zwicky | 210/519 |
| 1,624,092 | 4/1927 | Coleman | 210/519 |
| 1,662,762 | 3/1928 | Hebden | 210/525 |
| 2,403,354 | 7/1946 | Esdarle | 114/191 |
| 2,822,928 | 2/1958 | Wormser et al. | 210/523 |
| 2,881,923 | 4/1959 | Nelson | 210/525 |
| 3,870,634 | 3/1975 | Humphrey | 210/241 |
| 3,951,816 | 4/1976 | Bascope et al. | 210/525 |
| 3,966,617 | 6/1976 | Zaenkert | 210/519 |
| 4,271,017 | 6/1981 | Milgram | 210/519 |
| 4,994,179 | 2/1991 | Keiter et al. | 210/525 |

FOREIGN PATENT DOCUMENTS 728155 11/1942 Fed. Rep. of Germany .
2042357 9/1980 United Kingdom .

Primary Examiner—Stanley S. Silverman
Assistant Examiner—Christopher Upton
Attorney, Agent, or Firm—Arthur F. Zobal

[57] ABSTRACT

The oil and water separator includes a container having an oil and water inlet, an oil receiving means with an outlet, a skimmer mechanism for moving the oil at the surface of the fluid in the container into the oil receiving means, and a water outlet. The skimmer mechanism is formed by a plurality of angularly spaced apart blades located in the interior of the container above the level of the oil receiving mean and a ramp leading to the oil receiving means. Each blade is formed by an arm having a plurality of flexible blade members extending downward from the arm such that the blade members engage the top surface of the ramp upon rotation of the blade means past the ramp to move oil at the upper level of the fluid in the container, into the oil receiving means. Fluid flow directing device is provided for directing fluid injected into the interior of the container by way of the oil and water fluid inlet, downward and outward from the axis of the container. Support means is provided for supporting the container for pivotal movement about two axes perpendicular to each other for maintaining the dimension of the container between upper and lower ends generally vertical such that apparatus may be installed and operated on a boat.

7 Claims, 6 Drawing Sheets

CRUDE OIL AND WATER SEPARATOR

FIELD OF THE INVENTION

The invention relates to an oil and water separator of the type having a container for holding a fluid of oil and water and a rotating skimmer for separating the oil at the surface of the fluid in the container.

DESCRIPTION OF THE PRIOR ART

U.S. Pat. No. 3,947,355 discloses a separator for separating crude oil and water which is a complicated apparatus and unsuitable for use on a boat for separating crude oil and water for clean up purposes in oil spill situations.

SUMMARY OF THE INVENTION

It is the object of the invention to provide a simple, economical, and effective crude oil and water separator which may be used on a boat to separate crude oil from water and which is particularly useful in oil spill situations wherein oil is spilled or leaks into bays, rivers, etc.

It is a further objective of the invention to provide an improved crude oil and water separator of the type having a container with an oil and water inlet, an oil receiving means with an outlet, a skimmer means for moving the oil at the surface of the fluid in the container into the oil receiving means, and a water outlet.

In accordance with one aspect of the invention, the skimmer means comprises a plurality of angularly spaced apart blade means located in the interior of the container above the level of the oil receiving mean and a ramp leading to the oil receiving means. Each blade means comprises an arm means having a plurality of flexible blade members extending downward from the arm means such that the blade members engage the top surface of the ramp upon rotation of the blade means past the ramp to move oil at the upper level of the fluid in the container, into the oil receiving means.

In accordance with another aspect of the invention, fluid flow directing means is provided for directing fluid injected into the interior of the container by way of the oil and water fluid inlet, downward and outward toward the lower portion of the side wall of the container.

In accordance with a further aspect of the invention, support means is provided and which comprises means coupled to the container for supporting the container for pivotal movement about two axes perpendicular to each other for maintaining the dimension of the container between upper and lower ends generally vertical such that apparatus may be installed and operated on a boat.

DETAILED DESCRIPTION OF THE PREFERRED EMBODIMENTS

Figure 8:
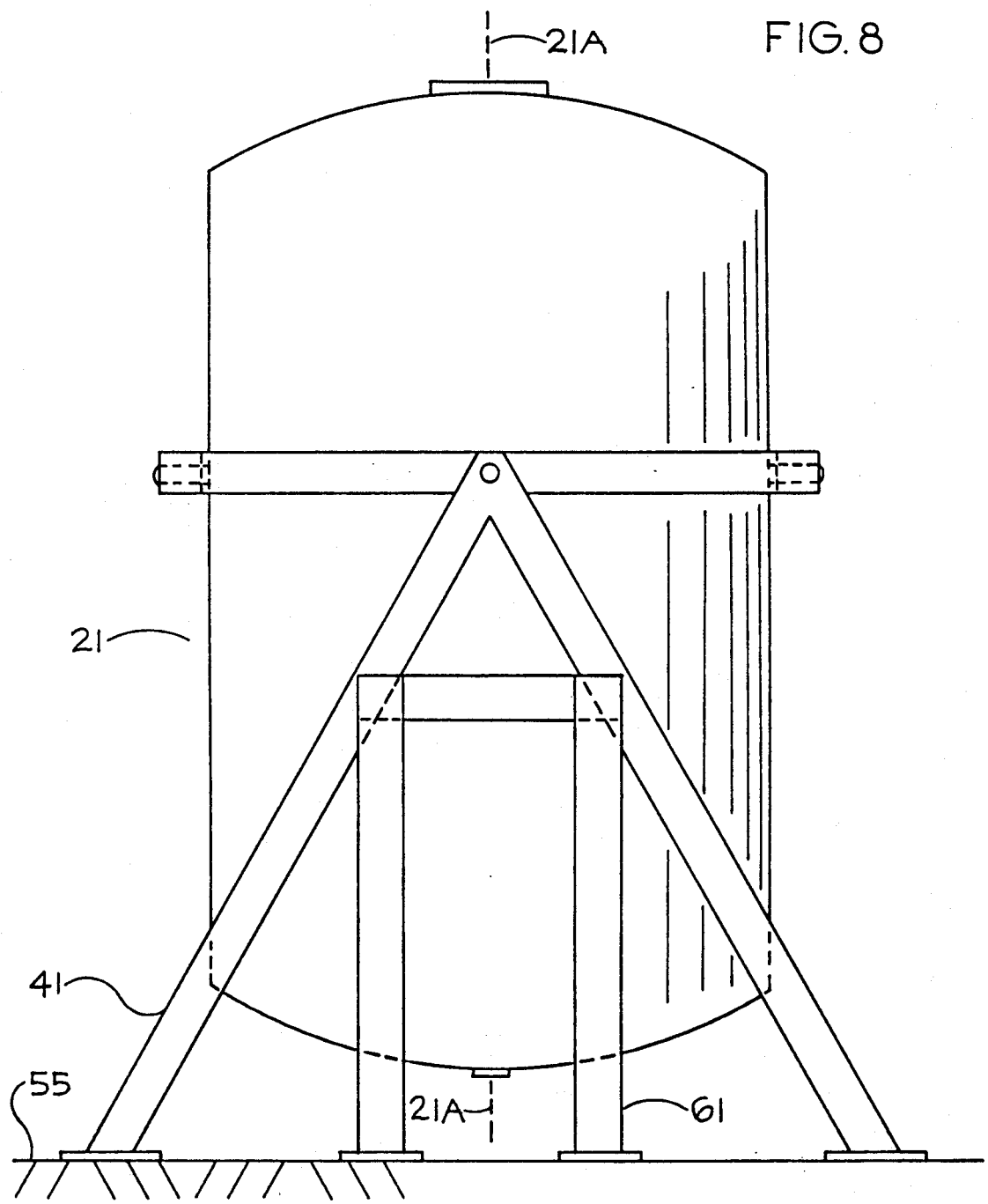
FIG. 8 is a side view of the container of the apparatus of the invention illustrating the support mechanism.
Figure 9:
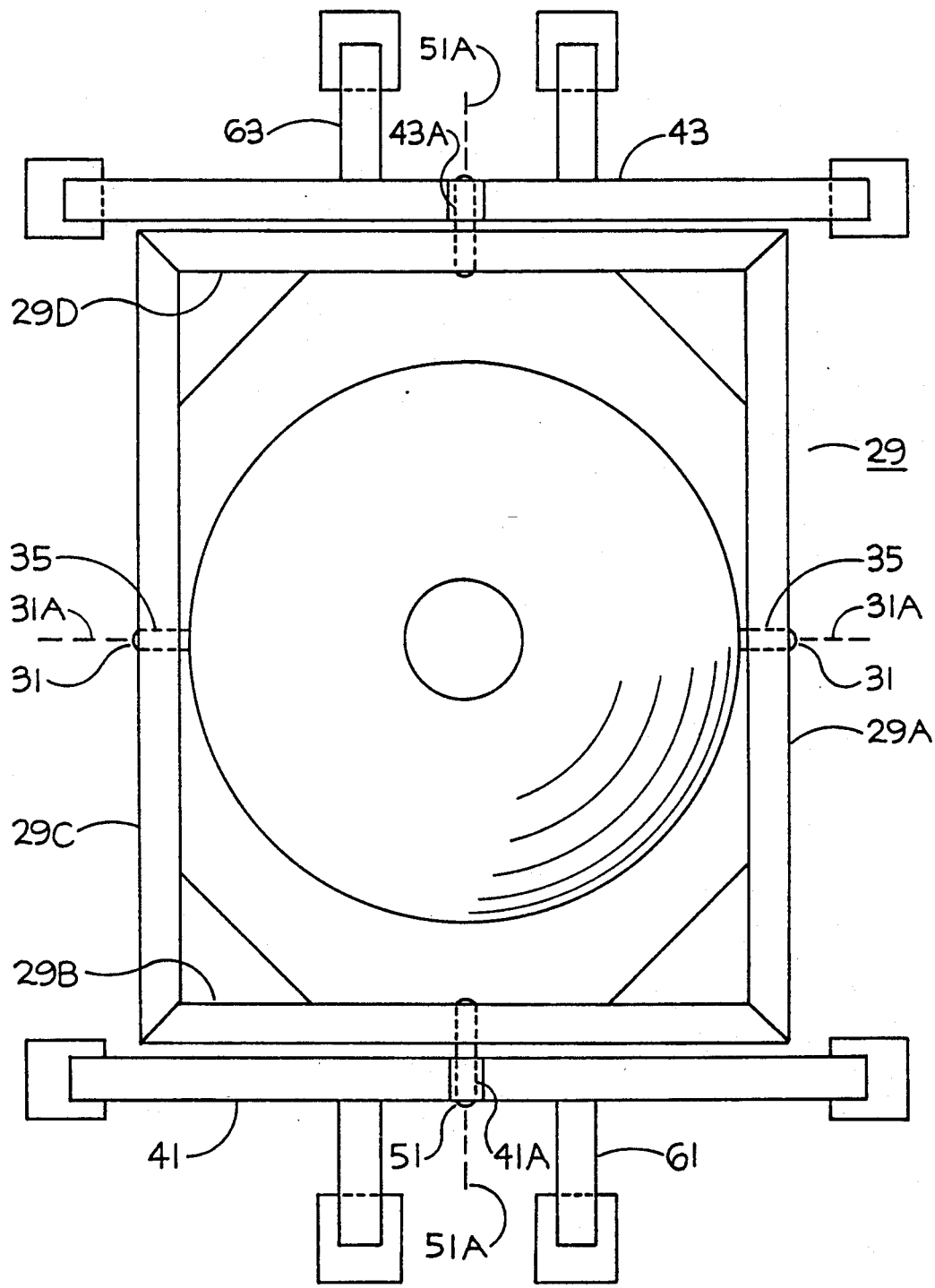
FIG. 9 is a top view of the container of the apparatus of the invention illustrating the support mechanism.

Referring now to the drawings, the apparatus of the invention comprises a container 21 having a cylindrical side wall 23, a bottom wall 25 at its lower end, and a top wall 27 at its upper end. As shown in FIGS. 8 and 9, the upper portion of the container 21 is pivotally supported to a rectangular frame 29 by way of rods 31. The frame 29 comprises four members 29A, 29B, 29C, and 29D connected together to form a central opening 33 in which is located the container 21. The rods 31 are fixedly secured to the cylindrical wall 21 and are pivotally located in apertures 35 formed through members 29A and 29C. Rods 31 are aligned along an axis 31A.

Members 29B and 29D are pivotally coupled to the tops of legs 41 and 43 respectively by rods 51 which are aligned along an axis 51A. Legs 41 and 43 are identical and are fixedly secured to structure 55 such as the deck of a boat or ship. Members 61 and 63 are identical braces which are secured to the legs 41 and 43 respectively and to the structure 55. Rods 51 are fixedly secured to members 29A and 29B and are supported for pivotal movement in apertures 41A and 43A formed through legs 41 and 43 respectively. Thus, the container 21 is supported for pivotal movement about two axes 31A and 51A whereby the elongated axis 21C of the container 21 is maintained vertical such that the top surface of the liquid injected into the container 21A is maintained horizontal whereby apparatus can be installed and effectively operated on a boat to separate water and oil in the fluid or liquid injected into the container 21.

Figure 1:
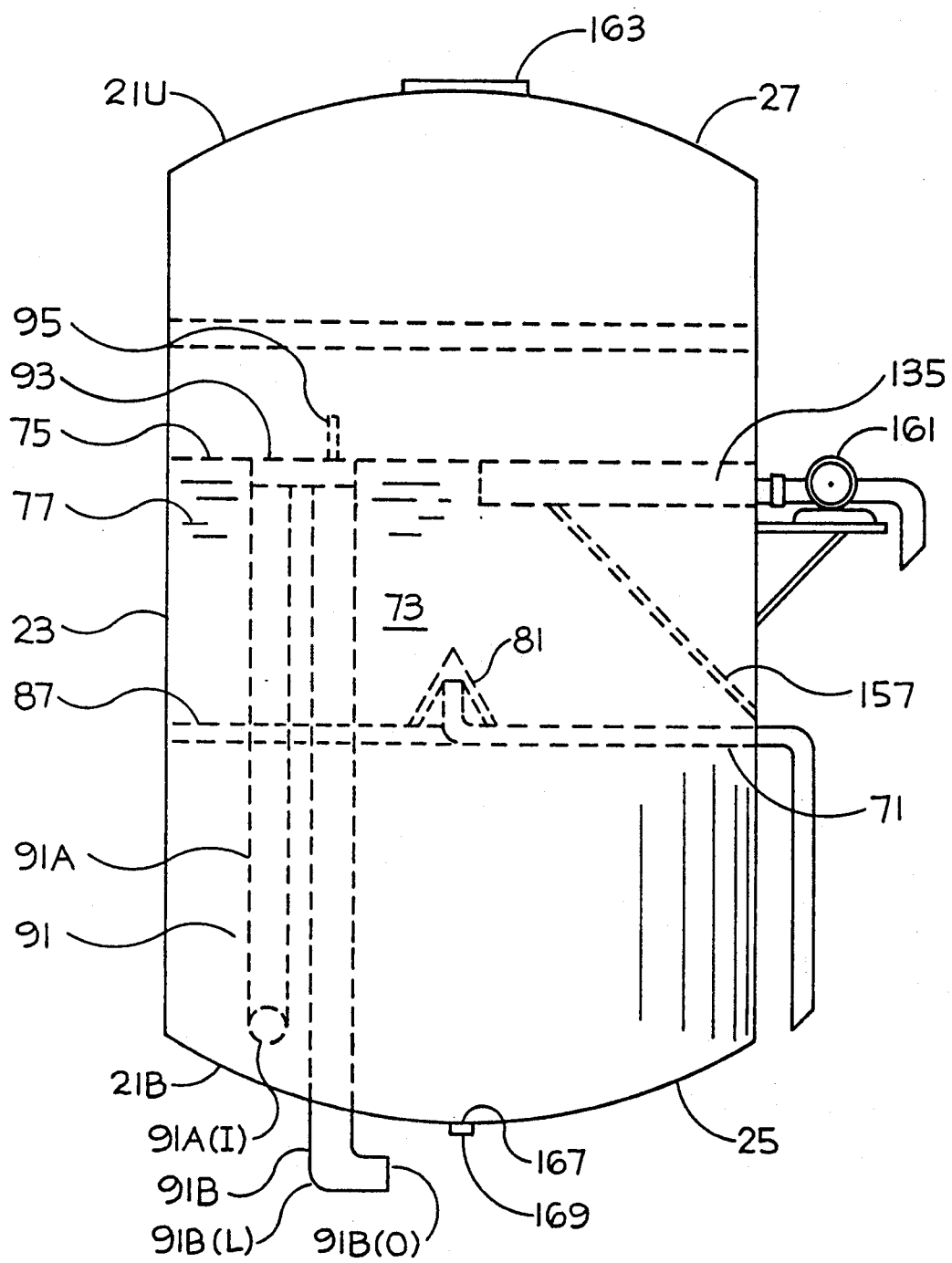
FIG. 1 is a side view of the container of the apparatus of the invention showing the oil and water inlet, the oil outlet and the water outlet.
Figure 2:
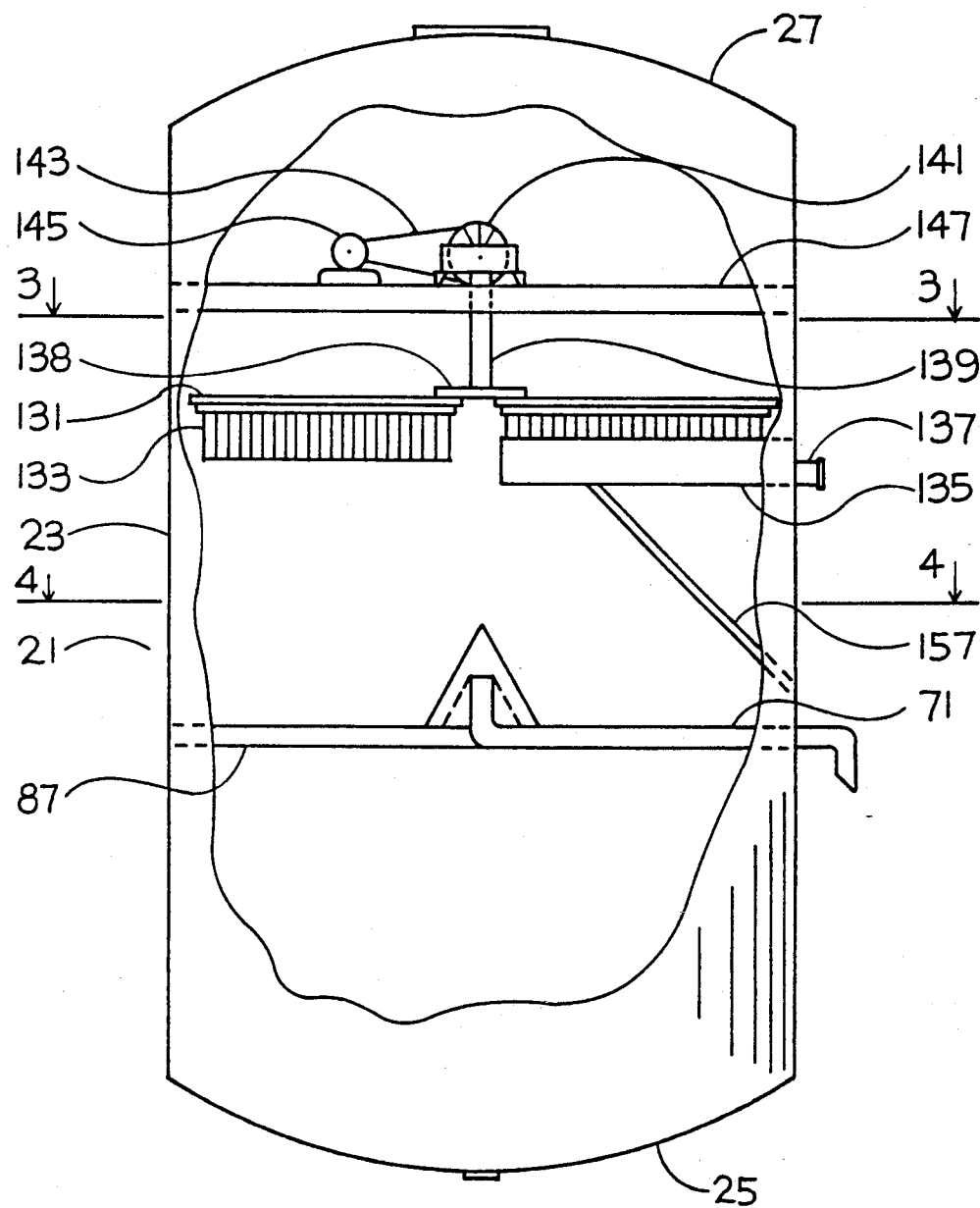
FIG. 2 is a side view of the container of the apparatus of the invention showing the skimmer mechanism.
Figure 5:
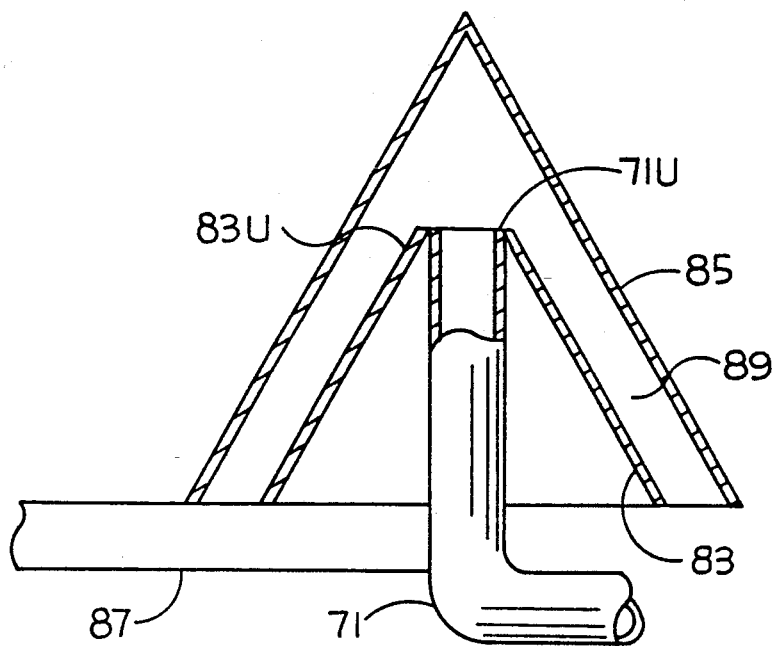
FIG. 5 illustrates in detail the fluid inlet flow device of the apparatus of FIGS. 1 and 2.

Referring to FIGS. 1, 2, and 5 there is provided an oil and water inlet conduit or pipe 71 extending from the exterior of the container 21 into the interior thereof to an intermediate position 73 above the lower end 21B. Water contaminated with oil in the bay, river, etc, in which the boat is located, is pumped through the conduit 71 into the interior of the container 21 where it fills the container to a level 75. The liquid in the container is identified at 77.

A liquid flow directing device 81 is provided which causes the liquid flowing from the upper end 71U of the conduit 71 to flow downward and outward from the axis 21A of the container. This enhances the flow of the water downward, and hence, separation of the oil from the water. The lighter oil flows upward to the top surface 75 where it is skimmed off and removed from the container. The heavier water flows downward where it is removed from the container 21 by way of a water outlet conduit 91.

Referring to FIG. 5, the device 81 comprises two inverted spaced apart conical shaped members 83 and 85 supported by braces 87 which are connected to the inside of the side wall 23. The braces 87 also support the upper portion of the inlet 71 and provide support for the water outlet means 91. Member 83 is a truncated cone and has its upper wall 83U secured around the upper end 71U of the conduit 71. Member 85 is a cone. Members 83 and 85 provide a downward and outward flowpath 89, and hence, direct the liquid flowing out of the upper end 71U of the conduit downward and outward from the axis 21A of the container 21.

Figure 7:
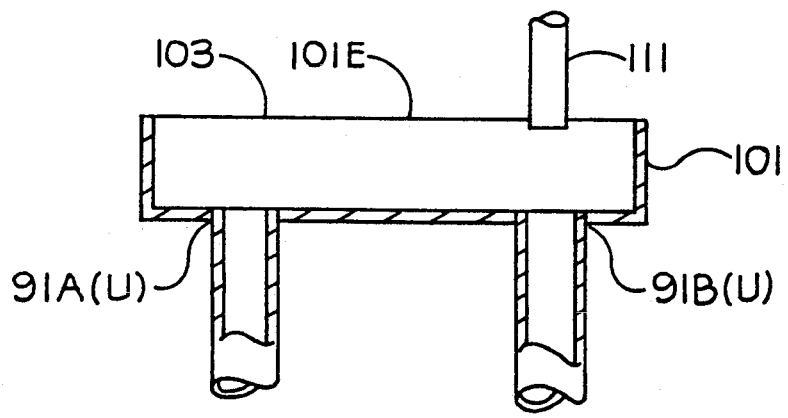
FIG. 7 is a cross-section of the liquid level control pan of FIG. 1.

The water outlet 91 comprises two conduits 91A and 91B coupled together. Conduit 91A has an inlet 91A(I) located near the bottom of the container and its upper end 91A(U) located at the upper portion of the interior of the container and coupled to a water level control device 101 which is a pan having its upper end open at 103 (See FIG. 7). The upper end of the conduit 91A is in fluid communication with the inside of the pan 101. The upper end 91B(U) of the conduit 91B is in fluid communication with the inside of the pan 101 and its lower end 91B(L) extends out of the container 21 and has a water discharge outlet 91B(L). Both of conduits 91A and 91B are supported by one of the braces 87, such as by clamps (not shown) coupled to the brace 87 and the conduits 91A and 91B. Water in the bottom of the container 21 flows through inlet 91(I), up the conduit 91A into the pan 101 and downward through conduit 91B and out of the container 21 by way of outlet 91B(O). Member 111 is a vent tube coupled to the side of pan 101. If the liquid level in the container rises above the upper edges 101E of the sides of the pan 101, it flows into the pan 101 and out of the container 21 by way of conduit 91B. The vertical positions of the conduits 91A and 91B can be raised or lowered to vary the level of the liquid in the container 21.

Figure 3:
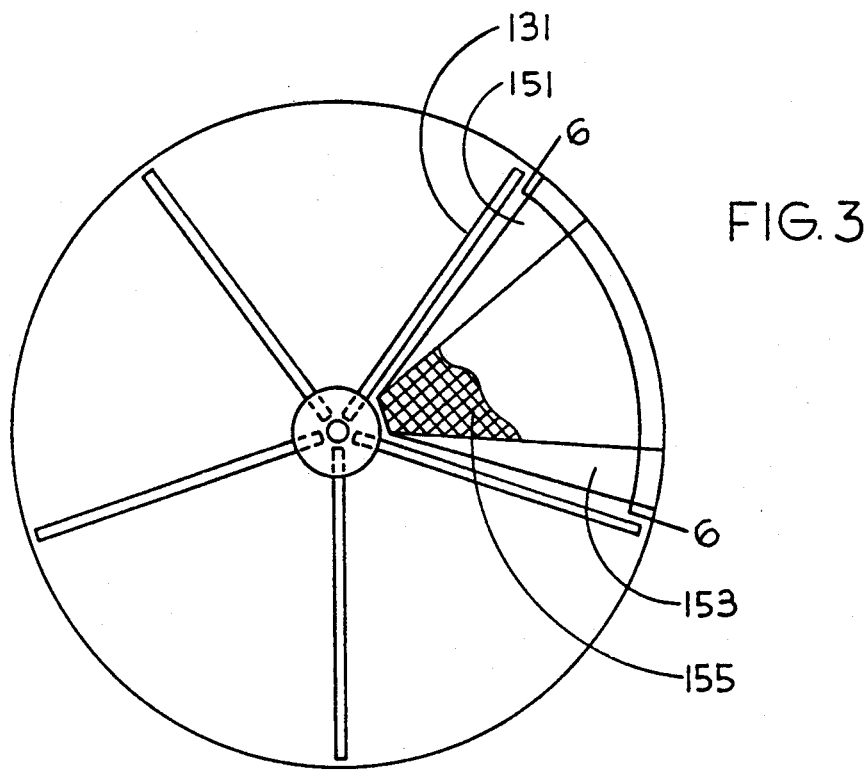
FIG. 3 is a top view of the skimmer blades and oil receiving reservoir as seen from FIG. 2 from plane 3—3 thereof.
Figure 4:
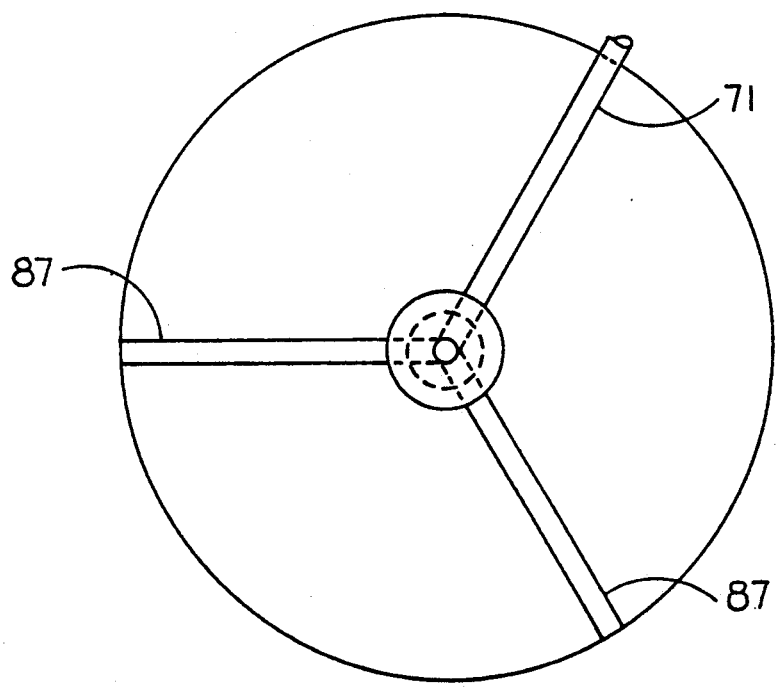
FIG. 4 is a view of the braces, and oil and water intake as seen from FIG. 2 from plane 4—4 thereof.
Figure 6:
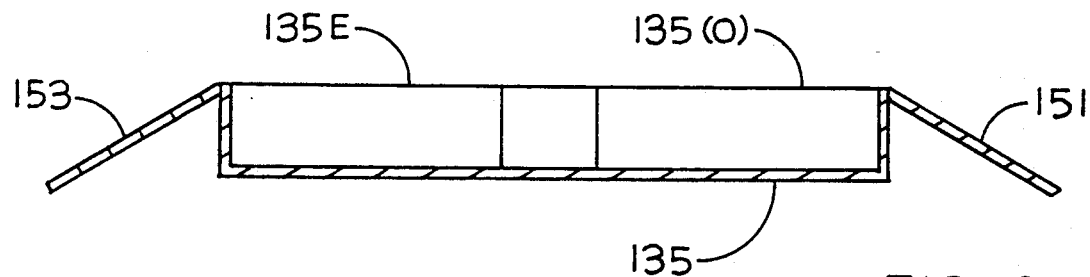
FIG. 6 is a cross-section of the oil reservoir and ramps of FIG. 3 taken along the arc 6—6 thereof.

Referring to FIGS. 2, 3, and 6, the skimmer mechanism for skimming and removing the oil from the upper surface of the liquid 77 in the container 21 comprises a plurality of angularly spaced apart arms 131 having flexible skimmer blades 133 extending downward therefrom and an oil reservoir or oil receiving pan 135 with an oil outlet conduit 137 coupled thereto and extending out of the container 21. Preferably there are five arms 131 having their inner ends connected to a plate 138 such that adjacent arms 131 form an angle of seventy two degrees. The plate 138 is connected to a shaft 139 having its upper end coupled to a gear box 141 which is operated by a belt 143 driven by a motor 145 for rotating the shaft 139 and hence the arms over and past the pan 135. The gear box 141 and motor 145 are supported by a mount 147 connected to the inside of wall 23. The top of pan 135 is open as shown at 135(O). The pan 135 is pie shaped and connected to the top edges of the pan are two ramps 151 and 153, each of which forms an angle of thirty degrees with respect to the horizontal. As seen in FIG. 3, the arms 131 are rotated clockwise such that they are sequentially moved above and over the ramp 151, the pan 135, and then the ramp 153. The top edge 135E of the pan 135 is at the top level of the liquid in the container and the flexible blades 133 hang down below this level such they move the oil at the upper surface into the pan 135. In moving up the ramp 151 the flexible blades drag against the top surface of the ramp 151 such that any water in the mass moved up the ramp 131 escapes through the spaces between the blades 133 as the oil in moved into the pan 135. The top of the pan 135 has a grill formed by an expanded metal plate 155 with openings such that the blades 133 do not go into the pan but as they scrape against the expanded metal plate 155, any excess oil is removed from the blades. The complete expanded metal plate 155 is not shown in FIG. 3 but extends over the opening 135(O). The oil flows into the pan through the openings of the expanded metal plate 155. The inner end of the pan 135 is supported by a brace 157 which is connected to the inside of the wall 23 of the container 21. The oil outlet conduit 137 has a pump 161 coupled thereto to facilitate removal of the oil from the pan 135.

In one embodiment, the container 21 may have a height of about 24 feet and a diameter of about 14 feet. An upper opening 163 in formed through the upper wall 27, and a drain 167 is formed through the lower wall 25 which is normally closed by a threaded plug 169, but which can be opened to drain out the liquid out of the container 21 after the separating operations have been terminated. The container 21 and its components 71, 81, 91, 135, 151, and 153 are formed of metal. Conduits 91A and 91B may be formed of metal or of a suitable plastic material. The blades 133 are of a suitable fabric, coated with rubber or a suitable elastomer. They may have a thickness or diameter of about one fourth of an inch and a length of about 16 inches. The arms 131 may be rotated at one rpm. The depth of the oil reservoir 135 may be twelve inches.

I claim:

1. Apparatus for separating oil and water in a fluid, comprising:

a container having an upper end and a lower end, formed by wall structure comprising side wall and bottom wall structure, support means for supporting said upper end above said lower end, oil and water fluid inlet means extending from the exterior of said container into the interior of said container to an intermediate position above said lower end, oil outlet means extending from an upper position in the interior of said container above the level of said intermediate position to the exterior of said container, water outlet means extending from a lower position in the interior of said container below the level of said intermediate position to the exterior of said container, oil receiving means comprising structure having an upper opening located in the interior of said container at the level of said upper position and in fluid communication with said oil outlet means, a ramp means located at an edge of said oil receiving means, the area of said oil receiving means and of said ramp in a plane extending through the dimension of said container between said upper and lower ends being less than the area of the interior of said container in said plane, skimmer means comprising a plurality of angularly spaced apart blade means located in the interior of said container above the level of said upper position, scraper means on said oil receiving means for removing oil from said blade means, means for rotating said plurality of spaced apart blade means in said container above and sequentially past said ramp means and said oil receiving means to move oil in the interior of said container at the level of said upper position into said oil receiving means by way of said opening, said blade means each comprising an arm means, and each arm means having a plurality of elongated flexible blade members extending downward from said arm means constructed and arranged such that said blade members engage the top surface of said ramp means upon rotation of said blade means past said ramp means to move oil into said oil receiving means while permitting water to escape between said blade members.

2. The apparatus of claim 1, wherein said support means comprises:
means coupled to said container for supporting said container for pivotal movement about two axes perpendicular to each other for maintaining said dimension of said container between said upper and lower ends of said container generally vertical such that said apparatus may be installed and operated on a boat.

3. Apparatus for separating oil and water in a fluid, comprising:
a container having an upper end and a lower end, formed by wall structure comprising side wall and bottom wall structure,
support means for supporting said upper end above said lower end,
said support means comprising means coupled to said container for supporting said container for pivotal movement about two axes perpendicular to each other for maintaining said dimension of said container between said upper and lower ends of said container generally vertical such that said apparatus may be installed and operated on a boat,
oil and water fluid inlet means extending from the exterior of said container into the interior of said container to an intermediate central position above said lower end,
fluid flow directing means for directing fluid injected into the interior of said container by way of said oil and water fluid inlet at said central intermediate position, downward and outward toward the lower portion of said side wall,
oil outlet means extending from an upper position in the interior of said container above the level of said intermediate position to the exterior of said container,
water outlet means extending from a lower position in the interior of said container below the level of said intermediate position to the exterior of said container,
oil receiving means comprising structure having an upper opening located in the interior of said container at the level of said upper position and in fluid communication with said oil outlet means,
the area of said oil receiving means in a plane extending through the dimension of said container between said upper and lower ends being less than the area of the interior of said container in said plane,
skimmer means comprising a plurality of angularly spaced apart blade means located in the interior of said container above the level of said upper position,
means for rotating said plurality of angularly spaced apart blade means in said container sequentially past said oil receiving means to move oil in the interior of said container at the level of said upper position into said oil receiving means by way of said opening.

4. The apparatus of claim 3, comprising:
ramp means located at an edge of said oil receiving means such that said plurality of angularly spaced apart blade means pass over said ramp means prior to passing over said oil receiving means upon rotation above and past said oil receiving means,
said blade means each comprises an arm means having a plurality of flexible blade members extending downward from said arm means such that said blade members engage the top surface of said ramp means upon rotation of said blade means past said ramp means to move oil into said oil receiving means.

5. The apparatus of claim 4, comprising:
pump means coupled to said oil outlet means for pumping oil out of said oil receiving means by way of said oil outlet means.

6. The apparatus of claim 4, wherein:
said oil and water fluid flow inlet means extends into the interior of said container to an upper end which faces generally upward,
said fluid flow directing means comprises structure forming a flow channel in fluid communication with said upper end of said oil and water fluid inlet means and which extends downward and outward to an interior outlet portion which is located below and outward of said upper end of said inlet means.

7. The apparatus of claim 3, wherein:
said oil and water fluid inlet means extends into the interior of said container to an upper end which faces generally upward,
said fluid flow directing means comprises structure forming a flow channel in fluid communication with said upper end of said oil and water fluid inlet means and which extends downward and outward to an interior outlet portion which is located below and outward of said upper end of said inlet means.

* * * * *